March 20, 1934.  J. P. GOULSTONE  1,951,694
MANUFACTURE OF VARI-COLORED ICE CREAM AND LIKE FROZEN FOOD PRODUCTS
Filed Nov. 25, 1930
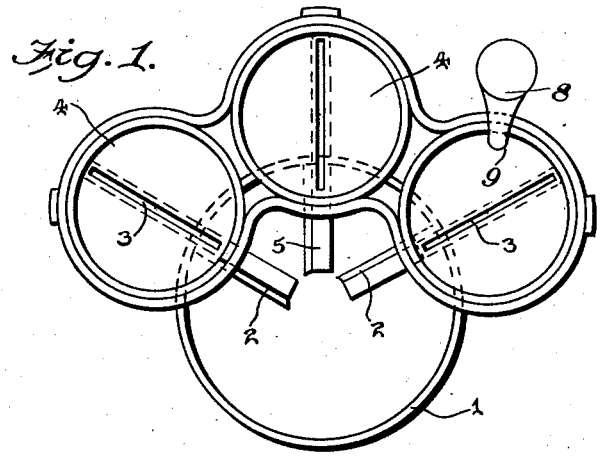
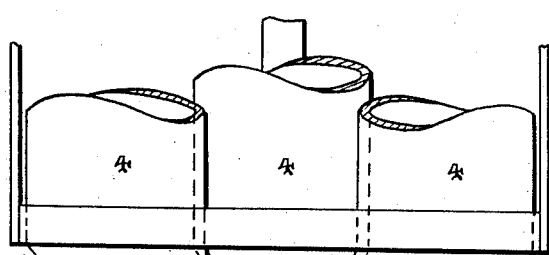
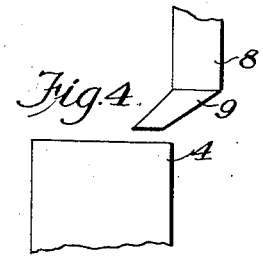
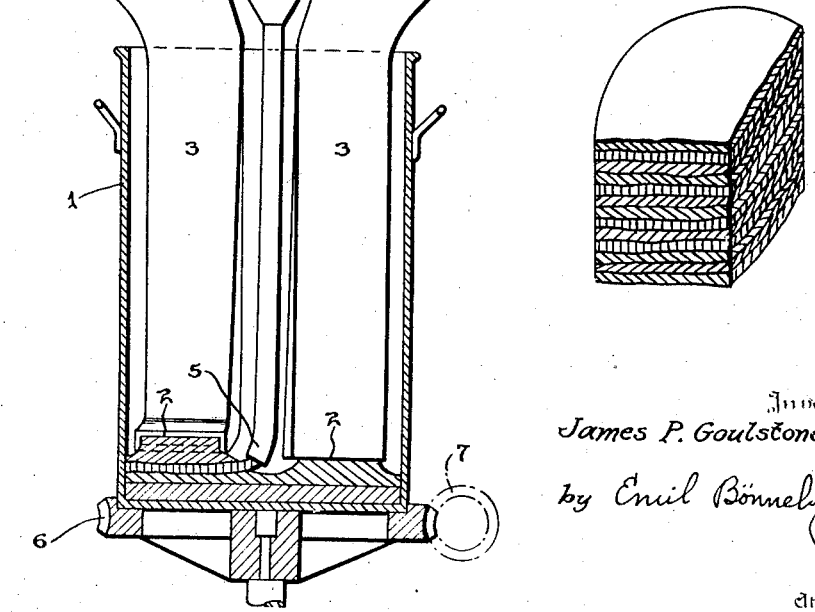
Inventor
James P. Goulstone,
by Emil Bönnelycke
Attorney Patented Mar. 20, 1934

1,951,694

UNITED STATES PATENT OFFICE 1,951,694

MANUFACTURE OF VARI - COLORED ICE CREAM AND LIKE FROZEN FOOD PRODUCTS

James Price Goulstone, South Melbourne, Victoria, Australia

Application November 25, 1930, Serial No. 498,119
In Australia December 11, 1929

7 Claims. (Cl. 226—100)

This invention relates to the manufacture of vari-colored ice-cream, ices, and similar frozen food products, having two or more differently colored layers.

Hitherto ice-cream of this kind has been manufactured only in tablet form, that is to say, in small blocks, and even in such form it has been relatively costly to manufacture on account of the numerous freezing operations required to be performed.

The object of the present invention is to provide means for manufacturing ice-cream of this vari-colored kind in bulk in the usual cans or containers for serving in shops and stores. By the invention, ice-cream of the vari-colored kind can be manufactured at considerably reduced cost compared with existing methods of manufacture, and furthermore, the ice-cream is deposited directly into the cans or containers for bulk distribution.

In the accompanying drawing:

Figure 1 is a plan view of one form of apparatus used according to the invention.

Figure 2 is a sectional side view of Figure 1.

Figure 3 shows an ice-cream product manufactured in accordance with the invention.

Figure 4 is an enlarged fragmentary view of one of the ice cream vessels and the means for depositing small substances therein.

The invention consists basically in extruding ice-cream or similar frozen food product of different colors through a plurality of substantially flat nozzles and causing the ice-cream so extruded to be deposited directly into the bulk cans in overlying layers. The ice-cream is maintained in plastic state while being extruded under pressure through the nozzles, and it is subsequently frozen to the desired degree of hardness to prevent mixture of the deposited colored layers.

In the drawing, 1 indicates an ordinary can used for the bulk distribution of ice-cream, and 2 the nozzles through which the ice-cream is extruded and deposited into said can. The nozzles are connected by vertical passages 3 to vessels 4 of any suitable character, which vessels contain required quantities of ice-cream of different colors.

The number of vessels 4 and nozzles 2 may vary from two upwardly, according to the number of differently colored layers required in the product to be manufactured, but preferably three are used as is shown in the drawing.

Each vessel 4 is provided with pressure means (not shown) for forcing the ice-cream downwardly through the passage 3 to cause it to be extruded through the nozzle. Said means may consist of a plunger actuated either by mechanical means or by suitable hand mechanism.

The nozzles 2 are of wide flat construction so that the ice-cream is caused to be extruded in thin wide bands and they are preferably spaced and positioned as shown in Figure 1 so that each extruded band of ice-cream is separately deposited into the can. However, if it be so desired, all three nozzles can be arranged together in superimposed positions. The nozzles are preferably offset slightly as is indicated by 5.

The can 1 is supported on a table 6, which is suitably rotated by suitable means such as a worm gear 7. Said table is also provided with any suitable gearing (not shown) whereby it can be lowered progressively as the layers of ice-cream are deposited into the can.

In the practical performance of the invention, the several differently colored ice-creams in plastic or semi-frozen states are placed in the vessels 4 and the pressure feed means of each vessel are operated. The ice-creams in the vessels are thus caused to be forced downwardly through the passage 3 and extruded through the flat nozzles 2 into the can 1. Simultaneously, the said can is rotated by the gear 7 and is also caused to slowly descend by the lowering gear (not shown). The extruded ice-cream is thus deposited into the can in overlying continuous layers of different colors from the bottom upwards, as shown in Figure 3. Each colored layer is comparatively thin so that when the ice-cream is served from the can each serving will contain quantities of several of the differently colored layers.

As soon as the can is filled with the extruded ice cream, it is placed in a freezer to solidify the ice-cream to the desired extent and thus prevent the differently colored layers from mixing or "running" together.

In some cases, the can may be given an oscillatory or other irregular movement during the extrusion of the ice-cream, thus causing the layers of differently colored ice-cream to be deposited in any desired irregular manner to produce variegated effects.

It will be obvious that the lowering gear for the can table 6 may be dispensed with so that the table rotating gear 7 is only used. In this case, means would be provided for raising the nozzles 2 progressively with the filling of the can. Again, the can may be stationary and means provided for rotating the nozzles 2 within the can to progressively deposit the ice-cream extruded from said nozzles.

In some cases small pieces or cubes of food substances which have been frozen may be added to the ice-cream contained in one or more of the vessels 4 from which the ice-cream is delivered to the extrusion nozzles 2. These small frozen pieces or cubes are of such character as to be capable of melting very readily in the consumer's mouth and be thus consumed simultaneously with the ice-cream. The frozen food substance or substances thus incorporated may consist of ice-cream of different colors or flavors, or chocolate or similar readily dissolvable material. Hitherto, preserved cherries and crystallized fruits have been incorporated in ice-cream. Such food substances are of relatively solid character, and consequently do not melt or dissolve readily in the mouth during the eating of the ice-cream in which they are incorporated. The food substances incorporated in the ice-cream according to my invention are such as will melt readily in the mouth, that is to say, they are substances which under normal temperature conditions are of liquid, plastic or semi-plastic form. Thus, they do not require to be chewed as do preserved cherries, crystallized fruits and the like.

In the performance of the invention, the cubes or small pieces are first formed by freezing and shaping in desired manner. The pieces are then subjected to a super-freezing treatment to a temperature of preferably below 20° Fahrenheit to cause them to be frozen hard, and the super-frozen pieces are then added to and mixed into the body of ice-cream in the vessels 4 whilst such ice-cream is in substantially plastic state. The step of super-freezing the cubes or small pieces is very important as it prevents them from melting while they are being incorporated in the plastic body ice-cream and consequential running together of the materials. The low temperature of the super-frozen cubes or small pieces causes the surrounding ice-cream to be frozen hard to form a protective area around each of the cubes or small pieces and thus protect them against melting.

If the cubes or small pieces consist of colored ice-cream, a frozen block is first formed and chopped into pieces of required size. If the pieces consist of chocolate pellets, they are preferably manufactured by an apparatus consisting of a heated vessel containing molten chocolate and a distributor for discharging the chocolate in the form of pellets.

In the drawing, a container 8 having a discharge spout 9 is provided for discharging the cubes or small pieces of food substances into the ice cream containers. While the container 8 is shown associated with only one of the receptacles 4, it is clear that each of the receptacles may be so equipped.

What I do claim is:—

1. An apparatus for filling bulk ice cream cans with vari-colored ice cream comprising a can support adapted to support a can during the filling operation, and a filling unit, said filling unit comprising a plurality of vessels, each vessel being adapted to receive a different kind of ice cream, a discharge conduit depending from the lower portion of each vessel, a nozzle on the discharge end of each discharge conduit, each nozzle having a substantially rectangular orifice which is horizontally elongated, said conduits and nozzles being spaced about a vertical axis, which axis substantially coincides with the vertical axis of a can on the support, said conduits and nozzles adapted to be within the can during the filling operation, means for extruding the ice cream through the nozzles in flat ribbons, and means for effecting relative rotation between the filling unit and ice cream can to effect depositions of the various ice creams in superposed helical layers.

2. An apparatus for filling bulk ice cream cans with vari-colored ice cream comprising a can support adapted to support a can during the filling operation, and a filling unit, said filling unit comprising a plurality of vessels, each vessel being adapted to receive a different kind of ice cream, a discharge conduit depending from the lower portion of each vessel, a nozzle on the discharge end of each discharge conduit, each nozzle having a substantially rectangular orifice which is horizontally elongated, said conduits and nozzles being spaced about a vertical axis, which axis substantially coincides with the vertical axis of a can on the support, said conduits and nozzles adapted to be within the can during the filling operation, means for extruding the ice cream through the nozzles in flat ribbons, means for effecting relative rotation between the filling unit and ice cream can to effect depositions of the various ice creams in superposed helical layers, and means for relatively spacing the can and nozzles in a vertical direction as the ice cream is deposited in the can.

3. An apparatus for filling bulk ice cream cans with vari-colored ice cream comprising a can support adapted to support a can during the filling operation, and a filling unit, said filling unit comprising a plurality of vessels, each vessel being adapted to receive a different kind of ice cream, a discharge conduit depending from the lower portion of each vessel, a nozzle on the discharge end of each discharge conduit, each nozzle having a substantially rectangular orifice which is horizontally elongated, said conduits and nozzles being spaced about a vertical axis, which axis substantially coincides with the vertical axis of a can on the support, said conduits and nozzles adapted to be within the can during the filling operation, means for extruding the ice cream through the nozzles in flat ribbons, and means for effecting relative rotation between the filling unit and ice cream can to effect depositions of the various ice creams in superposed helical layers, said nozzles being vertically offset with respect to each other.

4. An apparatus for filling bulk ice cream cans with vari-colored ice cream comprising a can support adapted to support a can during the filling operation, and a filling unit, said filling unit comprising a plurality of vessels, each vessel being adapted to receive a different kind of ice cream, a discharge conduit depending from the lower portion of each vessel, a nozzle on the discharge end of each discharge conduit, each nozzle having a substantially rectangular orifice which is horizontally elongated, said conduits and nozzles being spaced about a vertical axis, which axis substantially coincides with the vertical axis of a can on the support, said conduits and nozzles adapted to be within the can during the filling operation, means for extruding the ice cream through the nozzles in flat ribbons, and means for effecting rotation of the can to effect deposition of the various ribbons of ice cream to be deposited in helical layers.

5. A method of depositing a plurality of ice creams in a bulk can to produce a varigated ice cream, comprising forming various ice creams into flat ribbons and simultaneously and helically depositing the various ribbons in the can in superposed layers.

6. An apparatus for filling bulk ice cream cans with vari-colored ice cream as set forth in claim 1, including means for incorporating small pieces of frozen dissolvable food materials in the ice cream in the vessels, such pieces being in a superfrozen condition whereby they are prevented from melting when incorporated in the ice cream.

7. A method according to claim 5, including the incorporation in the ice cream of pieces of frozen food substances which melt readily in the mouth.

JAMES PRICE GOULSTONE.